(12) United States Patent
Kelley et al.

(10) Patent No.: US 8,399,134 B2
(45) Date of Patent: Mar. 19, 2013

(54) LEAD ACID BATTERY INCLUDING A TWO-LAYER CARBON FOAM CURRENT COLLECTOR

(75) Inventors: Kurtis C. Kelley, Washington, IL (US); Matthew J. Maroon, Metamora, IL (US)

(73) Assignee: Firefly Energy, Inc., Peoria, IL (US)

( * ) Notice: Subject to any disclaimer, the term of this patent is extended or adjusted under 35 U.S.C. 154(b) by 521 days.

(21) Appl. No.: 11/984,632

(22) Filed: Nov. 20, 2007

(65) Prior Publication Data

US 2009/0130549 A1    May 21, 2009

(51) Int. Cl.
| H01M 4/64 | (2006.01) |
|---|---|
| H01M 4/66 | (2006.01) |
| H01M 4/68 | (2006.01) |
| H01M 4/70 | (2006.01) |
| H01M 4/72 | (2006.01) |
| H01M 4/74 | (2006.01) |
| H01M 4/76 | (2006.01) |
| H01M 4/80 | (2006.01) |

(52) U.S. Cl. ........ 429/235; 429/163; 429/233; 429/238; 429/239; 429/241; 429/245; 429/302

(58) Field of Classification Search .................. 429/122, 429/245, 163, 233, 235, 238, 239, 241, 302
See application file for complete search history.

(56) References Cited

U.S. PATENT DOCUMENTS

| 1,285,660 A | 11/1918 | Ford |
|---|---|---|
| 2,620,369 A | 12/1952 | Daniel |
| 2,658,099 A | 11/1953 | Basset |
| 2,843,649 A | 7/1958 | Louis |
| 3,021,379 A | 2/1962 | Jackel |
| 3,188,242 A | 6/1965 | Kordesch et al. |
| 3,442,717 A | 5/1969 | Horn et al. |
| 3,510,359 A | 5/1970 | Selover, Jr. et al. |
| 3,565,694 A | 2/1971 | Chireau |
| 3,597,829 A | 8/1971 | Wagner et al. |

(Continued)

FOREIGN PATENT DOCUMENTS

| CN | 1 051 107 A | 5/1991 |
|---|---|---|
| DE | 29 07 262 A1 | 9/1980 |

(Continued)

OTHER PUBLICATIONS

Blood et al., "Electrodeposition of Lead Dioxide on Carbon Substrates From a High Internal Phase Emulsion (HIPE)," Journal of Applied Electrochemistry, vol. 34, 2004, pp. 1-7.

(Continued)

*Primary Examiner* — Basia Ridley
*Assistant Examiner* — Sean P Cullen
(74) *Attorney, Agent, or Firm* — Husche Blackwell LLP; H. Frederick Rusche; Robert C. Haldiman

(57) ABSTRACT

A lead acid battery includes a housing and at least one cell disposed within the housing. Each cell includes at least one positive plate and at least one negative plate and an electrolyte disposed in a volume between the positive and negative plates. The at least one negative plate includes a current collector, consisting essentially of a layer of carbon foam disposed on a substrate, and a chemically active material disposed on the current collector.

21 Claims, 5 Drawing Sheets

U.S. PATENT DOCUMENTS

| | | |
|---|---|---|
| 3,635,676 A | 1/1972 | Sands |
| 3,832,426 A | 8/1974 | Malthouse et al. |
| 3,833,424 A | 9/1974 | Louis et al. |
| 3,857,913 A | 12/1974 | Crow et al. |
| 3,960,770 A | 6/1976 | Raley, Jr. et al. |
| 4,011,374 A | 3/1977 | Kaun |
| 4,086,404 A | 4/1978 | Vissers et al. |
| 4,098,967 A | 7/1978 | Biddick et al. |
| 4,125,676 A | 11/1978 | Maricle et al. |
| 4,134,192 A | 1/1979 | Parkinson et al. |
| 4,152,825 A | 5/1979 | Bruneau |
| 4,188,464 A | 2/1980 | Adams et al. |
| 4,224,392 A | 9/1980 | Oswin |
| 4,275,130 A | 6/1981 | Rippel et al. |
| 4,289,835 A | 9/1981 | Lee et al. |
| 4,317,872 A | 3/1982 | Varma |
| 4,339,322 A | 7/1982 | Balko et al. |
| 4,363,857 A | 12/1982 | Mix |
| 4,374,186 A | 2/1983 | McCartney et al. |
| 4,485,156 A | 11/1984 | Tokunaga |
| 4,566,877 A | 1/1986 | Pazdej et al. |
| 4,717,633 A | 1/1988 | Hauser |
| 4,749,451 A | 6/1988 | Naarmann |
| 4,758,473 A | 7/1988 | Herscovici et al. |
| 4,832,870 A | 5/1989 | Clough et al. |
| 4,865,931 A | 9/1989 | McCullough, Jr. et al. |
| 4,900,643 A | 2/1990 | Eskra et al. |
| 5,017,446 A | 5/1991 | Reichman et al. |
| 5,106,709 A | 4/1992 | Tekkanat et al. |
| 5,162,172 A | 11/1992 | Kaun |
| 5,200,281 A | 4/1993 | Leap et al. |
| 5,208,003 A | 5/1993 | Simandl et al. |
| 5,223,352 A | 6/1993 | Pitts et al. |
| 5,229,228 A | 7/1993 | Doniat et al. |
| 5,232,797 A * | 8/1993 | Moulton et al. ............... 429/210 |
| 5,260,855 A | 11/1993 | Kaschmitter et al. |
| 5,268,395 A | 12/1993 | Simandl et al. |
| 5,300,272 A | 4/1994 | Simandl et al. |
| 5,348,817 A | 9/1994 | Rao et al. |
| 5,374,490 A | 12/1994 | Aldecoa |
| 5,376,479 A | 12/1994 | Gerner |
| 5,393,619 A | 2/1995 | Mayer et al. |
| 5,395,709 A | 3/1995 | Bowker et al. |
| 5,401,596 A | 3/1995 | Stoilov et al. |
| 5,402,306 A | 3/1995 | Mayer et al. |
| 5,411,818 A | 5/1995 | Barlow et al. |
| 5,426,006 A | 6/1995 | Delnick et al. |
| 5,429,893 A | 7/1995 | Thomas |
| 5,441,824 A | 8/1995 | Rippel |
| 5,474,621 A | 12/1995 | Barnard |
| 5,498,489 A | 3/1996 | Dasgupta et al. |
| 5,508,131 A | 4/1996 | Bowen et al. |
| 5,512,390 A | 4/1996 | Obushenko |
| 5,529,971 A | 6/1996 | Kaschmitter et al. |
| 5,538,810 A | 7/1996 | Kaun |
| 5,543,247 A | 8/1996 | Pulley et al. |
| 5,563,007 A | 10/1996 | Young et al. |
| 5,569,563 A | 10/1996 | Ovshinsky et al. |
| 5,580,676 A | 12/1996 | Honda et al. |
| 5,593,797 A | 1/1997 | Brecht |
| 5,595,840 A | 1/1997 | Henning et al. |
| 5,626,977 A | 5/1997 | Mayer et al. |
| 5,636,437 A | 6/1997 | Kaschmitter et al. |
| 5,643,684 A | 7/1997 | Tsubouchi et al. |
| 5,665,265 A | 9/1997 | Gies et al. |
| 5,667,909 A | 9/1997 | Rodriguez et al. |
| 5,670,266 A | 9/1997 | Thomas et al. |
| 5,677,075 A | 10/1997 | Fujita |
| 5,691,087 A | 11/1997 | Rao et al. |
| 5,705,259 A | 1/1998 | Mrotek et al. |
| 5,712,054 A | 1/1998 | Kejha |
| 5,723,232 A | 3/1998 | Yamada et al. |
| 5,738,907 A | 4/1998 | Vaccaro et al. |
| 5,766,797 A | 6/1998 | Crespi et al. |
| 5,882,621 A | 3/1999 | Doddapaneni et al. |
| 5,888,469 A | 3/1999 | Stiller et al. |
| 5,898,564 A | 4/1999 | Mayer et al. |
| 5,932,185 A | 8/1999 | Pekala et al. |
| 5,955,215 A | 9/1999 | Kurzwell et al. |
| 5,989,749 A * | 11/1999 | Kao et al. ...................... 429/241 |
| 5,993,996 A | 11/1999 | Firsich |
| 6,001,761 A | 12/1999 | Hata et al. |
| 6,033,506 A | 3/2000 | Klett |
| 6,037,032 A | 3/2000 | Klett et al. |
| 6,045,943 A | 4/2000 | Nowaczyk |
| 6,060,198 A | 5/2000 | Snaper |
| 6,077,464 A | 6/2000 | Murdie et al. |
| 6,077,623 A | 6/2000 | Grosvenor et al. |
| 6,103,149 A | 8/2000 | Stankiewicz |
| 6,117,592 A | 9/2000 | Hoshino et al. |
| 6,127,061 A | 10/2000 | Shun et al. |
| 6,146,780 A | 11/2000 | Cisar et al. |
| 6,183,854 B1 | 2/2001 | Stiller et al. |
| 6,193,871 B1 | 2/2001 | Coates et al. |
| 6,217,841 B1 | 4/2001 | Grindatto et al. |
| 6,241,957 B1 | 6/2001 | Stiller et al. |
| 6,245,461 B1 | 6/2001 | Smith et al. |
| 6,248,467 B1 | 6/2001 | Wilson et al. |
| 6,258,473 B1 | 7/2001 | Spillman et al. |
| 6,261,485 B1 | 7/2001 | Klett |
| 6,287,721 B1 | 9/2001 | Xie et al. |
| 6,296,746 B1 | 10/2001 | Broman et al. |
| 6,316,148 B1 | 11/2001 | Timmons et al. |
| 6,319,627 B1 | 11/2001 | Snyder et al. |
| 6,323,160 B1 | 11/2001 | Murdie et al. |
| 6,332,990 B1 | 12/2001 | Mayer et al. |
| 6,346,226 B1 | 2/2002 | Stiller et al. |
| 6,379,845 B1 | 4/2002 | Inazawa et al. |
| 6,383,687 B1 | 5/2002 | Gibbons et al. |
| 6,387,343 B1 | 5/2002 | Klett |
| 6,395,423 B1 | 5/2002 | Kawakami et al. |
| 6,399,149 B1 | 6/2002 | Klett et al. |
| 6,438,964 B1 | 8/2002 | Giblin |
| 6,482,299 B1 | 11/2002 | Inganäs et al. |
| 6,500,401 B2 | 12/2002 | Reznek et al. |
| 6,528,204 B1 | 3/2003 | Hikmet et al. |
| 6,566,004 B1 | 5/2003 | Fly et al. |
| 6,569,559 B1 | 5/2003 | Rouillard et al. |
| 6,576,365 B1 | 6/2003 | Meitav et al. |
| 6,605,390 B1 | 8/2003 | Moore et al. |
| 6,631,073 B1 | 10/2003 | Sakata et al. |
| 6,706,079 B1 | 3/2004 | Shmatko et al. |
| 6,979,512 B2 | 12/2005 | Phillips |
| 6,979,513 B2 * | 12/2005 | Kelley et al. ................... 429/121 |
| 7,097,939 B2 | 8/2006 | Ferreira et al. |
| 2001/0019800 A1 | 9/2001 | Herreyre et al. |
| 2002/0027066 A1 | 3/2002 | Kanno et al. |
| 2002/0061436 A1 | 5/2002 | Inagaki et al. |
| 2002/0081478 A1 | 6/2002 | Busenbender |
| 2002/0114990 A1 | 8/2002 | Fly et al. |
| 2002/0136680 A1 | 9/2002 | Kanno et al. |
| 2002/0150822 A1 | 10/2002 | Marlow et al. |
| 2003/0003343 A1 | 1/2003 | Cisar et al. |
| 2003/0099884 A1 | 5/2003 | Chiang et al. |
| 2003/0104280 A1 | 6/2003 | Venkatesan et al. |
| 2003/0108785 A1 | 6/2003 | Wu et al. |
| 2004/0002006 A1 | 1/2004 | Kelley et al. |
| 2004/0053104 A1* | 3/2004 | Novkov et al. .................. 429/34 |
| 2004/0121237 A1 | 6/2004 | Kelley et al. |
| 2004/0121238 A1 | 6/2004 | Kelley et al. |
| 2004/0191632 A1* | 9/2004 | Kelley et al. ................... 429/235 |
| 2005/0042512 A1 | 2/2005 | Ferreira et al. |
| 2005/0084762 A1* | 4/2005 | Vaccaro et al. ................ 429/302 |
| 2005/0191555 A1 | 9/2005 | Kelley et al. |
| 2005/0235472 A1* | 10/2005 | Jung ................................ 29/2 |
| 2006/0068294 A1 | 3/2006 | Mraz et al. |
| 2008/0187863 A1* | 8/2008 | Tomantschger ............... 429/122 |

FOREIGN PATENT DOCUMENTS

| | | |
|---|---|---|
| EP | 0 085 400 A1 | 8/1983 |
| EP | 0 555 978 A1 | 8/1993 |
| EP | 1 225 160 A2 | 7/2002 |
| GB | 18590 | 8/1910 |
| GB | 2 200 068 A | 7/1988 |
| JP | 59177862 A | 10/1984 |
| JP | 59177863 A | 10/1984 |
| JP | 61250968 A | 11/1986 |

| | | |
|---|---|---|
| JP | 61270205 A | 11/1986 |
| JP | 63057649 A | 3/1988 |
| JP | 01018982 A | 1/1989 |
| JP | 2002220217 A2 | 8/2002 |
| WO | WO 94/23462 A1 | 10/1994 |
| WO | WO 95/06002 A1 | 3/1995 |
| WO | WO 98/02382 A1 | 1/1998 |
| WO | WO 98/27023 A1 | 6/1998 |
| WO | WO 99/11585 A1 | 3/1999 |
| WO | WO 99/11586 A2 | 3/1999 |
| WO | WO 99/61549 A1 | 12/1999 |
| WO | WO 99/64223 A1 | 12/1999 |
| WO | WO 00/16418 A1 | 3/2000 |
| WO | WO 00/43314 A1 | 7/2000 |
| WO | WO 01/66490 A2 | 9/2001 |
| WO | WO 02/18271 A1 | 3/2002 |
| WO | WO 02/18272 A1 | 3/2002 |
| WO | WO 02/094533 A1 | 11/2002 |
| WO | WO 03/028130 A1 | 4/2003 |
| WO | WO 03/067684 A2 | 8/2003 |
| WO | WO 2004/004027 A2 | 1/2004 |
| WO | WO 2004/062005 A2 | 7/2004 |
| WO | WO 2005/096418 A1 | 10/2005 |

OTHER PUBLICATIONS

Czerwinski et al., "Electrochemical Behavior of Lead Dioxide Deposited on Reticulated. Vitreous Carbon (RVC)," Journal of Power Sources, vol. 64, 1997, pp. 29-34.

Davis et al., "Electrochemical Characterization of a Microcellular Carbon Foam/Epoxy Composite Electrode," Analytical Chemistry, vol. 62, No. 10, May 15, 1990, pp. 1000-1003.

http://www.powertechnologyonline.com/progress.html, Power Technology, Inc., Jan. 15, 2002.

International Search Report re PCT/US2008/002731 dated Jul. 24, 2008.

* cited by examiner

LEAD ACID BATTERY INCLUDING A TWO-LAYER CARBON FOAM CURRENT COLLECTOR

TECHNICAL FIELD

This invention relates generally to configurations of an electrical storage device, and, more particularly, to a configuration of a lead acid battery including one or more carbon foam current collectors.

BACKGROUND

Electrochemical batteries, including, for example, lead acid and nickel-based batteries, among others, are known to include at least one positive current collector, at least one negative current collector, and an electrolytic solution. In lead acid batteries, for example, both the positive and negative current collectors are constructed from lead. The role of these lead current collectors is to transfer electric current to and from the battery terminals during the discharge and charging processes. Storage and release of electrical energy in lead acid batteries is enabled by chemical reactions that occur in a chemically active material disposed on the current collectors. The positive and negative current collectors, once coated with this chemically active material, are referred to as positive and negative plates, respectively. A notable limitation on the durability of lead-acid batteries is corrosion of the current collectors and other components of the battery.

One method of extending the service life of a lead acid battery is to increase the corrosion resistance of the components included in the battery. Several methods have been proposed for inhibiting the corrosion process in lead acid batteries. Because carbon does not oxidize at the temperatures at which lead-acid batteries generally operate, some of these methods have involved using carbon in various forms to slow or prevent the detrimental corrosion process in lead acid batteries. For example, U.S. Pat. No. 5,512,390 (hereinafter the '390 patent) discloses a lead acid battery that includes current collectors made from graphite plates instead of lead. The graphite plates have sufficient conductivity to function as current collectors, and they are more corrosion resistant than lead. Substituting graphite plates for the lead current collectors may, therefore, lengthen the life of a lead-acid battery.

While the battery of the '390 patent may potentially offer a lengthened service life as a result of reduced corrosion, the graphite plates of the '390 patent are problematic. For example, the graphite plates of the '390 patent are dense, flat sheets of material each having a relatively small amount of surface area. Unlike lead electrode plates of a conventional lead-acid battery, which are generally patterned into a grid-like structure to increase the available surface area of the plates, the graphite plates of the '390 patent are smooth sheets with no patterning. In lead acid batteries, an increase in surface area of the current collector may increase the specific energy and power of the battery and, therefore, may translate into improved battery performance. More surface area on the current collectors may also lead to a reduction in the time required for charging and discharging of the battery. The relatively small surface area of the graphite plates of the '390 patent may result in poorly performing batteries that have slow charging times.

Additionally, the graphite plates of the '390 patent lack the toughness of lead current collectors. The dense, graphite plates of the '390 patent can be brittle and may fracture when subjected to physical shock or vibration. Such physical shock and vibration commonly occur in vehicular applications, for example. Any fracturing of the graphite plates would lead to degradation of the current carrying ability of the graphite plates. Therefore, despite offering an increased resistance to corrosion, the brittle nature of the graphite plates of the '390 patent could actually result in battery service lives shorter than those possible through use of ordinary non-carbon based materials.

The present invention is directed to overcoming one or more of the problems or disadvantages existing in the prior art.

SUMMARY OF THE INVENTION

One embodiment of the present invention includes a lead acid battery. The lead acid battery includes a housing and at least one cell disposed within the housing. The at least one cell includes at least one positive plate and at least one negative plate. An electrolyte is disposed in a volume between the positive and negative plates. The at least one negative plate includes a current collector, consisting essentially of a layer of carbon foam disposed on a substrate, and a chemically active material disposed on the current collector.

Another embodiment of the present invention includes a lead acid battery. The lead acid battery includes a housing and at least one cell disposed within the housing. The at least one cell includes at least one positive plate and at least one negative plate. An electrolyte is disposed in a volume between the positive and negative plates. The at least one positive plate includes a current collector, consisting essentially of a layer of carbon foam disposed on a substrate, and a chemically active material disposed on the current collector.

Yet another embodiment of the present invention includes a lead-acid battery including a housing. At least one cell is disposed within the housing and includes at least one positive plate and at least one negative plate. A silica gel electrolyte, including silica particles in an amount of about 1% to about 8% by weight and having an average size less than about 1 micron, is disposed in a volume between the positive and negative plates. The at least one negative plate includes a current collector, consisting essentially of a layer of carbon foam disposed on a lead grid substrate, and a chemically active material disposed on the current collector. The at least one positive plate includes a lead grid current collector.

DETAILED DESCRIPTION

Figure 1:
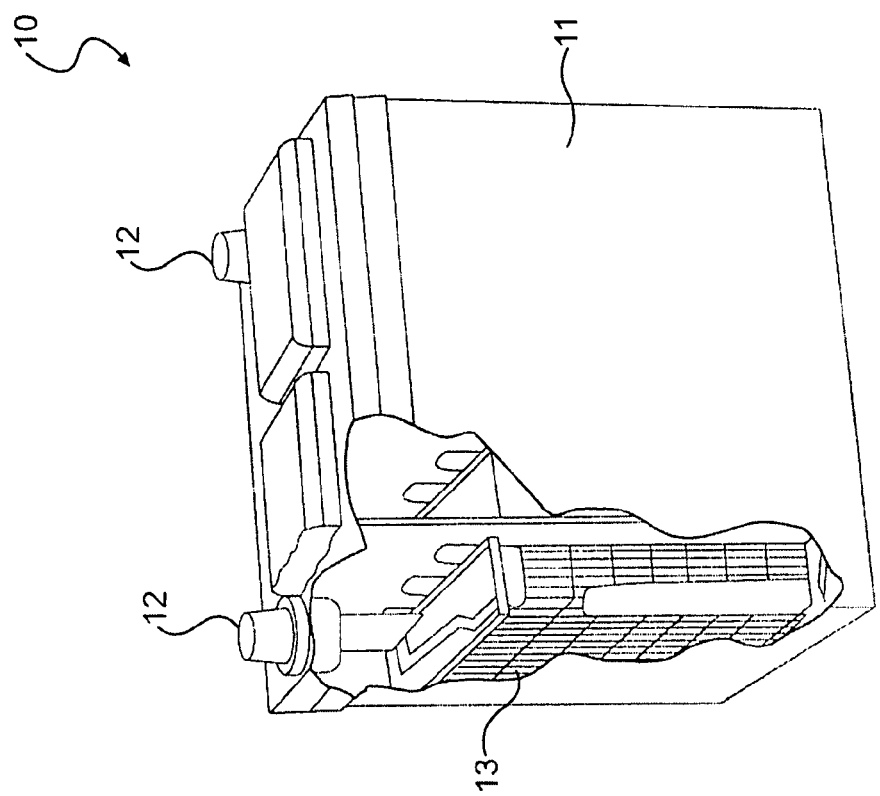
FIG. 1 is a diagrammatic cut-away representation of a battery in accordance with an exemplary embodiment of the present invention.

FIG. 1 illustrates a battery 10 in accordance with an exemplary embodiment of the present invention. Battery 10 includes a housing 11 and terminals 12 external to housing 11. At least one cell 13 is disposed within housing 11. While only one cell 13 is necessary, multiple cells may be connected in series or in parallel to provide a desired total potential of battery 10.

Each cell 13 may be composed of alternating positive and negative plates, and an electrolyte may be disposed in a volume between the positive and negative plates. Additionally, the electrolyte can occupy some or all of the pore space in the materials included in the positive and negative plates. In one embodiment, the electrolyte includes an aqueous electrolytic solution within which the positive and negative plates may be immersed. The electrolytic solution composition may be chosen to correspond with a particular battery chemistry. In lead acid batteries, for example, the electrolyte may include a solution of sulfuric acid and distilled water. Other acids, however, may be used to form the electrolytic solutions of the disclosed batteries.

In another embodiment, the electrolyte may include a gel. For example, the gel electrolyte may include a silica-based gel. To prepare the silica gel, silica particles having a primary particle size of less than about 1 micron may be added to an aqueous electrolytic solution as described above. In certain embodiments, silica particles may be added to a solution of sulfuric acid and distilled water in an amount of about 1% to about 8% by weight to form a gel electrolyte. This gel electrolyte can be added to battery 10 such that the gel at least partially fills a volume between the positive and negative plate or plates of cell 13.

The positive and negative plates of each cell 13 may include a current collector packed or coated with a chemically active material. Chemical reactions in the active material disposed on the current collectors of the battery enable storage and release of energy. The composition of this active material, and not the current collector material, determines whether a particular current collector functions either as a positive or a negative plate.

The composition of the chemically active material also depends on the chemistry of battery 10. For example, lead acid batteries may include a chemically active material including, for example, an oxide or salt of lead. In certain embodiments, the chemically active material may include lead oxide (PbO). The chemically active material may also include various additives including, for example, varying percentages of free lead, structural fibers, conductive materials, carbon, and extenders to accommodate volume changes over the life of the battery. In certain embodiments, the constituents of the chemically active material for lead acid batteries may be mixed with sulfuric acid and water to form a paste, slurry, or any other type of coating material.

The chemically active material in the form of a paste or a slurry, for example, may be applied to the current collectors of the positive and negative plates. The chemically active material may be applied to the current collectors by dipping, painting, or via any other suitable coating technique.

The positive and negative plates of battery 10 are formed by first depositing the chemically active material on the corresponding current collectors to make the plates. While not necessary in all applications, in certain embodiments, the chemically active material deposited on current collectors may be subjected to curing and/or drying processes. For example, a curing process may include exposing the chemically active materials to elevated temperature and/or humidity to encourage a change in the chemical and/or physical properties of the chemically active material.

After assembling the positive and negative plates to form cells 13 of battery 10, the battery may be subjected to a charging (i.e., formation) process. During this charging process, the composition of the chemically active materials may change to a state that provides an electrochemical potential between the positive and negative plates of the cells. For example, in a lead acid battery, the PbO active material of the positive plate may be electrically driven to lead dioxide ($PbO_2$), and the active material of the negative plate may be converted to sponge lead. Conversely, during subsequent discharge of a lead acid battery, the chemically active materials of both the positive and negative plates convert toward lead sulfate.

Figure 2:
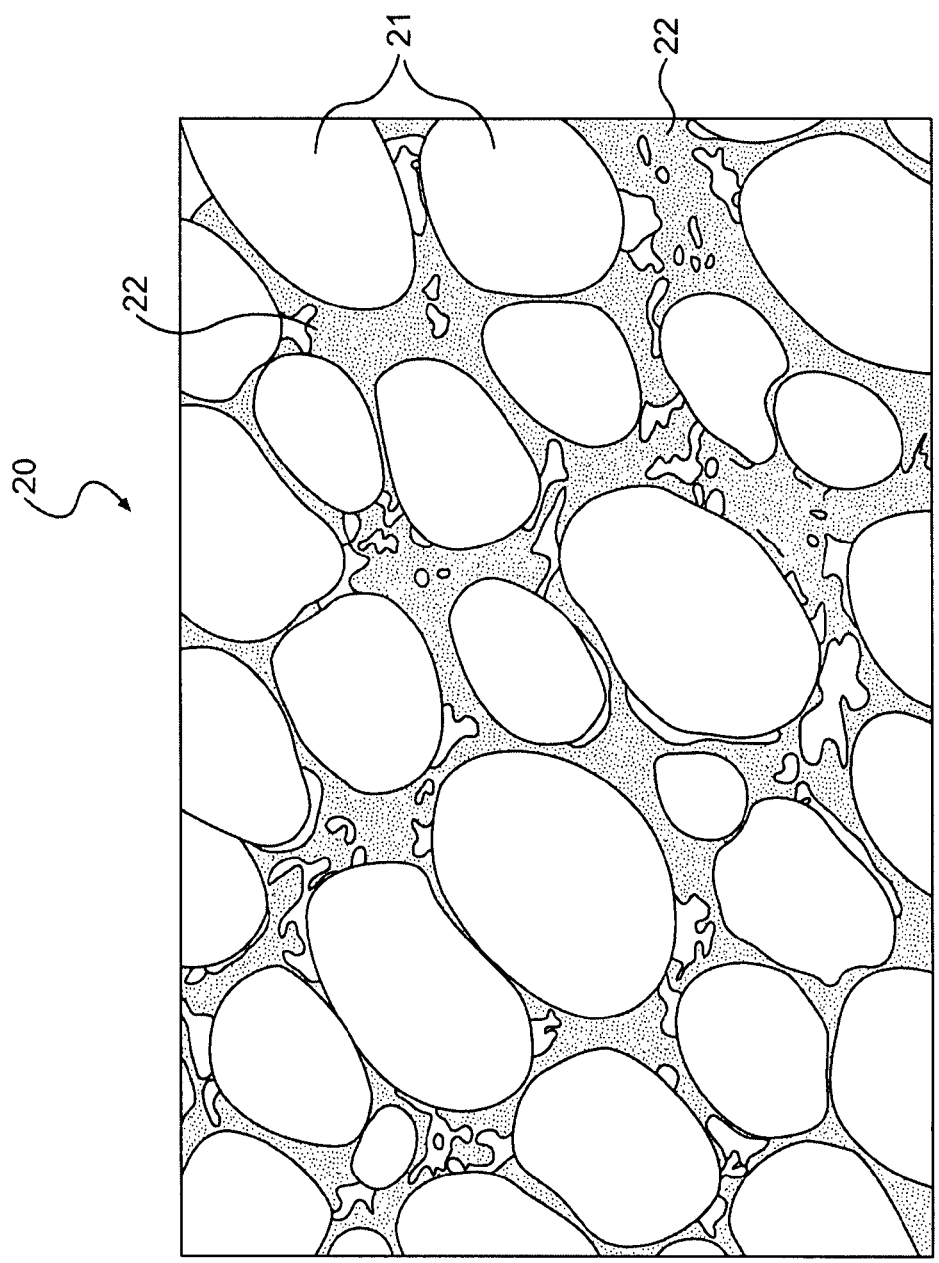
FIG. 2 is a diagrammatic, close-up representation of the porous structure of the carbon foam that may be included in a current collector in accordance with an exemplary embodiment of the present invention.

FIG. 2 provides a close-up diagrammatic representation of a carbon foam material 20 that may be included in the positive and/or negative plates of cell 13. This carbon foam material may include any carbon or carbon-based materials that exhibit some degree of porosity. The carbon foam of the presently disclosed embodiments can resist corrosion even when exposed to electrolytes and to the electrical potentials of the positive or negative plates. The carbon foam includes a network of pores, which can provide a large amount of surface area for each current collector. Current collectors composed of carbon foam may exhibit more than 2000 times the amount of surface area provided by conventional current collectors.

The disclosed foam material may include any carbon-based material having a three-dimensional network of struts and pores. The foam may comprise either or both of naturally occurring and artificially derived materials. In certain embodiments, the carbon foam may include from about 4 to about 50 pores per centimeter and an average pore size of at least about 200 microns. In other embodiments, however, the average pore size may be smaller. For example, in certain embodiments, the average pore size may be at least about 20 microns. In still other embodiments, the average pore size may be at least about 40 microns.

Regardless of the average pore size of the carbon foam material, a total porosity value for the carbon foam may be at least 60%. In other words, at least 60% of the volume of the carbon foam structure may be included within pores 21, shown in FIG. 2. Moreover, the carbon foam may have an open porosity value of at least 70%. That is, at least 70% of pores 21 are open to adjacent pores such that the network of pores 21 forms a substantially open network. In certain embodiments, this open network of pores 21 may allow the active material deposited on the current collectors to penetrate within the carbon foam structure. In addition to the network of pores 21, the carbon foam includes a web of structural elements 22 that provide support for the carbon foam. In total, the network of pores 21 and the structural elements 22 of the carbon foam may result in a density of less than about 0.6 $gm/cm^3$ for the carbon foam material.

The carbon foam of the presently disclosed embodiments may also exhibit at least some degree of electrical conductivity. In some embodiments, the carbon foam may offer sheet resistivity values of less than about 1 ohm-cm. In still other embodiments, the carbon foam may have sheet resistivity values of less than about 0.75 ohm-cm.

In addition to carbon foam, graphite foam may also be used in the current collectors of the positive and/or negative plates of cells 13. One such graphite foam, under the trade name PocoFoam™, is available from Poco Graphite, Inc. The density and pore structure of graphite foam may be similar to carbon foam. Due to the more oriented nature of graphite, however, graphite foam may offer higher conductivity, as compared to carbon foam. For example, graphite foam may exhibit electrical resistivity values of between about 100 micro-ohm-cm and about 2500 micro-ohm-cm.

The carbon and graphite foams of the present invention may also be obtained by subjecting various organic materials to a carbonizing and/or graphitizing process. In one exemplary embodiment, various wood species may be carbonized and/or graphitized to yield the carbon foam material. Wood includes a natural occurring network of pores. These pores may be elongated and linearly oriented. Moreover, as a result of their water-carrying properties, the pores in wood form a substantially open structure. Certain wood species may offer an open porosity value of at least about 70%. The average pore size of wood may vary among different wood species, but in an exemplary embodiment of the invention, the wood used to form the carbon foam material has an average pore size of at least about 20 microns.

Many species of wood may be used to form the carbon foam of the invention. As a general class, most hardwoods have pore structures suitable for use in the carbon foam current collectors of the invention. Exemplary wood species that may be used to create the carbon foam include oak, mahogany, teak, hickory, elm, sassafras, bubinga, palms, and many other types of wood. Optionally, the wood selected for use in creating the carbon foam may originate from tropical growing areas. For example, unlike wood grown in climates with significant seasonal variation, wood from tropical regions may have a less defined growth ring structure. As a result, the porous network of wood from tropical areas may lack certain non-uniformities that can result from the presence of growth rings.

To produce the carbon foam, wood may be subjected to a carbonization process to create carbonized wood (e.g., a carbon foam material). For example, heating of the wood to a temperature of between about 800° C. and about 1400° C. may have the effect of expelling volatile components from the wood. The wood may be maintained in this temperature range for a time sufficient to convert at least a portion of the wood to a carbon matrix. This carbonized wood will include the original porous structure of the wood. As a result of its carbon matrix, however, the carbonized wood can be electrically conductive and resistant to corrosion. During the carbonization process, the wood may be heated and cooled at any desired rate. In one embodiment, however, the wood may be heated and cooled sufficiently slowly to minimize or prevent cracking of the wood/carbonized wood. Also, heating of the wood may occur in an inert environment.

The carbonized wood may be used without additional processing. Optionally, however, the carbonized wood may be subjected to a graphitization process to create graphitized wood (e.g., a graphite foam material). Graphitized wood is carbonized wood in which at least a portion of the carbon matrix has been converted to a graphite matrix. As previously noted, the graphite structure may exhibit increased electrical conductivity as compared to non-graphite carbon structures. Graphitizing the carbonized wood may be accomplished by heating the carbonized wood to a temperature of between about 2400° C. and about 3000° C. for a time sufficient to convert at least a portion of the carbon matrix of the carbonized wood to a graphite matrix. Heating and cooling of the carbonized wood may proceed at any desired rate. In one embodiment, however, the carbonized wood may be heated and cooled sufficiently slowly to minimize or prevent cracking. Also, heating of the carbonized wood may occur in an inert environment.

Figure 3A:
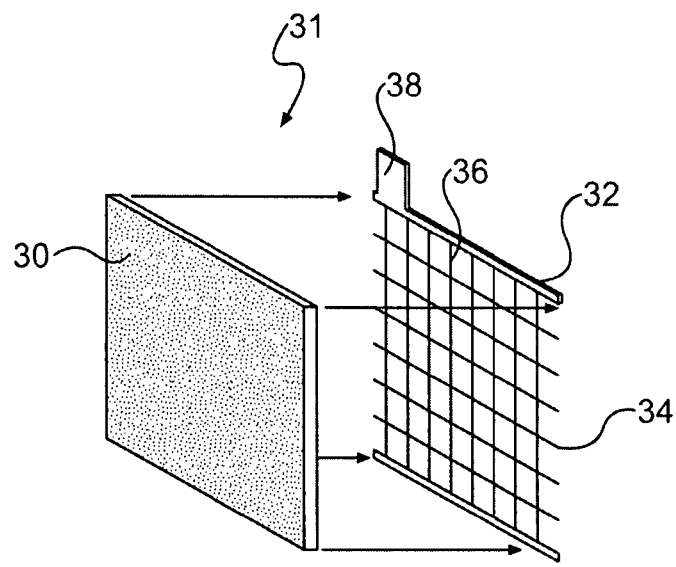
FIGS. 3A-3C provide diagrammatic representations of a current collector including carbon foam disposed on a substrate in accordance with exemplary embodiments of the present invention.
Figure 3B:
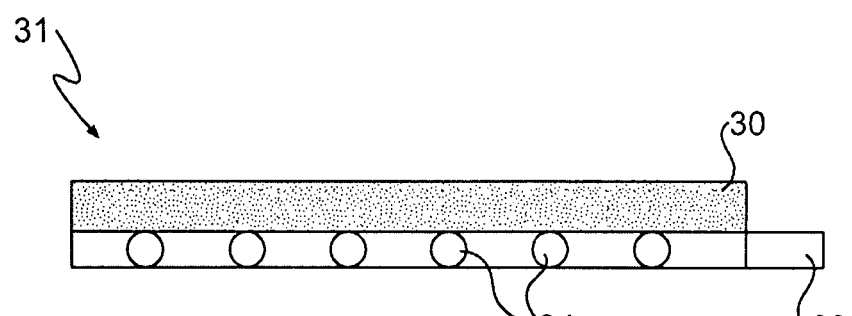
Figure 3C:
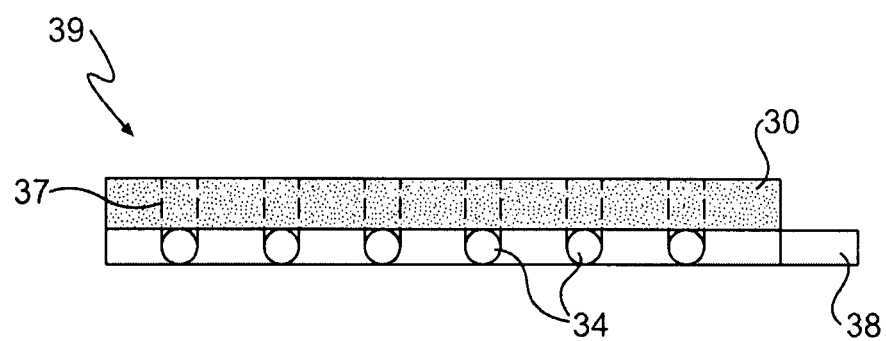

FIGS. 3A-3C provide diagrammatic representations of a current collector 31 in accordance with certain exemplary disclosed embodiments. Current collector 31 consists essentially of a two-layer structure including a layer of carbon foam 30 disposed on a substrate 32. FIG. 3A provides a perspective view illustrating the assembly of current collector 31. FIG. 3B provides a cross sectional view of the assembled current collector 31, and FIG. 3C provides another cross sectional view of current collector 31 showing an optional mechanical fastening system 37. It should be noted that while current collector 31 is described as a two-layer structure, each of the two layers may include one or more sub-layers of like material. For example, carbon foam layer 30 may include multiple sub-layers of carbon foam. Similarly, substrate 32 may include multiple sub-layers of the particular material used to make the substrate.

In current collector 31, carbon foam layer 30 may include any carbon foam material described above. Further, carbon foam layer 30 may be fabricated to exhibit any combination of physical properties described above.

Figure 4:
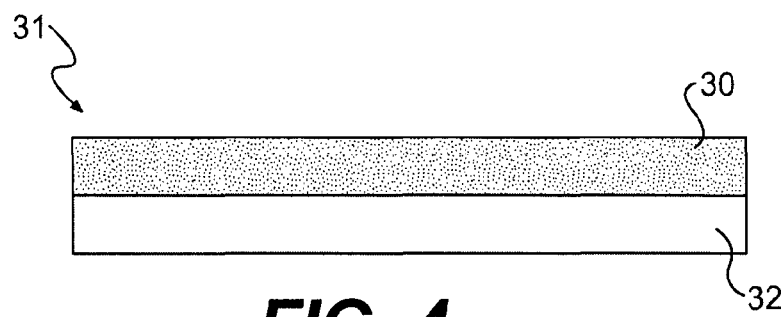
FIG. 4 provides a diagrammatic representation of a current collector including carbon foam disposed on a substrate in accordance with another exemplary embodiment of the present invention.

Substrate 32 may include several different material and physical configurations. For example, in certain embodiments, substrate 32 may include an electrically conductive material, glass, or a polymer. In certain embodiments, substrate 32 may include lead or polycarbonate. Substrate 32 may be formed as a single sheet of material, as shown in FIG. 4. Alternatively, substrate 32 may include an open structure, such as a grid pattern having cross members 34 and struts 36, as shown in FIG. 3A.

Substrate 32 may include a tab 38 for establishing an electrical connection to current collector 31. Alternatively, especially in embodiments where substrate 32 includes a polymer or material with low electrical conductivity, carbon foam layer 30 may be configured to include a tab of material (not shown) for establishing an electrical connection with current collector 31. In such an embodiment, the carbon foam used to form a tab on carbon foam layer 30 may be infused with a metal such as lead, silver, or any other suitable metal for aiding in providing good mechanical and electrical contact to carbon foam layer 30.

Carbon foam layer 30 may be physically attached to substrate 32 such that substrate 32 can provide support for carbon foam layer 30. In one embodiment, carbon foam layer 30 may be laminated to substrate 32. For example, carbon foam layer 30 and substrate 32 may be subjected to any suitable laminating process, which may include the application of heat and/or pressure, such that carbon foam layer 30 becomes physically attached to substrate 32. In certain embodiments, heat and/or pressure sensitive laminating films or adhesives may be used to aid in the lamination process.

In other embodiments, carbon foam layer 30 may be physically attached to substrate 32 via a system of mechanical fasteners 37, as shown in FIG. 3C. This system of fasteners may include any suitable type of fasteners capable of fastening carbon foam layer 30 to support 32. For example, carbon foam layer 30 may be joined to support 32 using staples, wire or plastic loop fasteners, rivets, swaged fasteners, screws, etc. Alternatively, carbon foam layer 30 can be sewn to support 32 using wire thread, or other types of thread.

As discussed above, the carbon foam material included in carbon foam layer 30 may have a total porosity value of at least 60%. It should be noted that this porosity value includes not only the material property of the carbon foam (i.e., the carbon foam itself has a total porosity value of greater than 60%), but also the effective porosity of the entire carbon foam layer (i.e., which includes any machining or other layer configuration that introduces effective porosity into the carbon foam layer as a whole, without altering the fundamental material property of the carbon foam itself).

In addition to the two-layered current collector 31 described above, the presently disclosed embodiments may include other types of current collectors in combination with the two-layered current collector. For example, current collectors suitable for use with the presently disclosed embodiments may be formed substantially from carbon foam alone. That is, a carbon foam current collector consistent with this embodiment would lack a support backing. The carbon foam current collector may, however, include other materials, such as, e.g., metals deposited on a portion of the carbon foam surface to aid in establishing electrical contact with the carbon foam current collector.

Figure 5A:
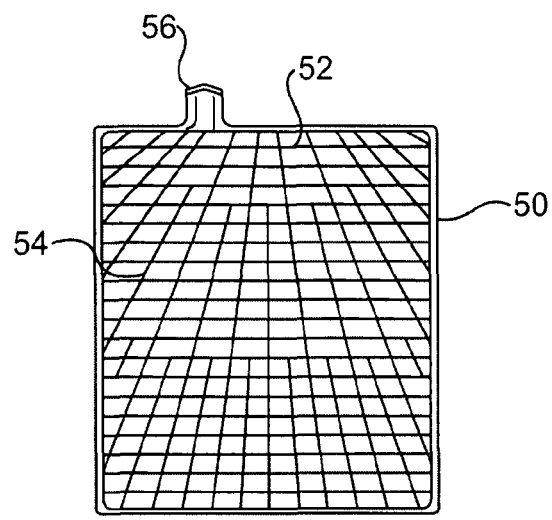
FIG. 5A provides a plan view of a lead grid current collector in accordance with an exemplary embodiment of the present invention.
Figure 5B:
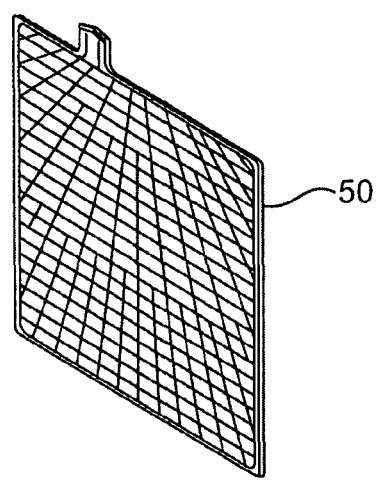
FIG. 5B provides a perspective view of a lead grid current collector in accordance with an exemplary embodiment of the present invention.

Other current collectors may be formed substantially from an electrically conductive material, such as lead, for example. FIG. 5A provides a plan view, and FIG. 5B provides a perspective view of a current collector 50 that may be incorporated into one or more of the electrode plates of cell 13. Current collector 50 may be made from lead and may be formed to include a grid pattern of cross members 52 and struts 54. In one embodiment, current collector 50 may include a radial grid pattern such that struts 54 intersect cross members 52 at an angle. As illustrated in FIG. 5A, struts 54 may be oriented to radiate outwardly moving from the top of current collector 50 to the bottom. Current collector 50 may also include a tab 56 useful for establishing electrical contact to the current collector.

Figure 6A:
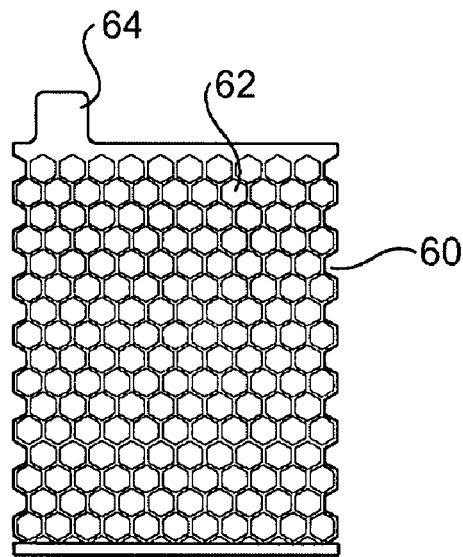
FIG. 6A provides a plan view of a lead grid current collector in accordance with an exemplary embodiment of the present invention.
Figure 6B:
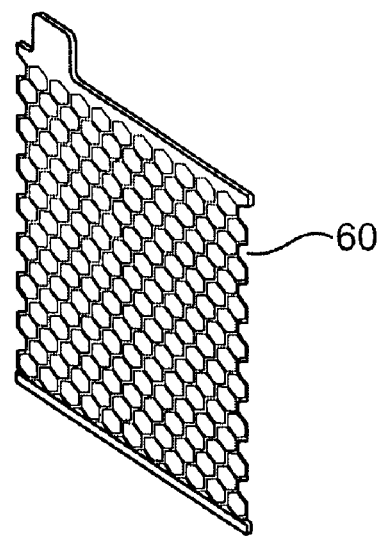
FIG. 6B provides a perspective view of a lead grid current collector in accordance with an exemplary embodiment of the present invention.

FIG. 6A provides a plan view, and FIG. 6B provides a perspective view of another current collector 60 that may be incorporated into one or more of the electrode plates of cell 13. In this embodiment, current collector 60 may be made from lead and may be formed to include a hexagonal grid pattern. Specifically, the structural elements of current collector 60 may be configured to form a plurality of hexagonally shaped interstices in a hexagonally close packed arrangement. Current collector 60 may also include a tab 64 useful for establishing electrical contact to the current collector.

Consistent with the present invention, cells 13 may be configured to include several different current collector arrangements. In a first embodiment, one or more negative plates of cell 13 may include a current collector 31 having a carbon foam layer 30 disposed on a substrate 32. In this embodiment, one or more positive plates of cell 13 may include a carbon foam current collector (e.g., a carbon foam layer not including a substrate) or a lead grid current collector (e.g., a lead grid collector not including a layer of carbon foam).

In another embodiment, one or more positive plates of cell 13 may include a current collector 31 having a carbon foam layer 30 disposed on a substrate 32. In this embodiment, one or more negative plates of cell 13 may include a carbon foam current collector (e.g., a carbon foam collector not including a substrate) or a lead grid current collector (e.g., a lead grid collector not including a layer of carbon foam).

In yet a third embodiment, both one or more negative plates and one or more positive plates may include a current collector 31 having a carbon foam layer 30 disposed on a substrate 32. Thus, in this embodiment, the two-layered current collector 31 may be incorporated into both the positive and the negative electrode plates.

INDUSTRIAL APPLICABILITY

By incorporating carbon into the positive and/or negative plates of battery 10, corrosion of the current collectors may be suppressed. As a result, batteries consistent with the present invention may offer significantly longer service lives.

Additionally, the large amount of surface area associated with the carbon foam materials may translate into batteries having both large specific power and specific energy values. Specifically, because of the open cell, porous network and relatively small pore size of the carbon foam materials, the chemically active material of the positive and negative plates can be intimately integrated with the current collectors. The reaction sites in the chemically active paste, therefore, can be close to one or more conductive, carbon foam structural elements 22. Therefore, electrons produced in the chemically active material at a particular reaction site must travel only a short distance through the paste before encountering one of the many conductive structural elements 22 of a particular current collector. As a result, batteries including current collectors incorporating carbon foam may offer both improved specific power and specific energy values. In other words, these batteries, when placed under a load, may sustain their voltage above a predetermined threshold value for a longer time than batteries including traditional current collectors made of lead, graphite plates, etc.

The increased specific power values offered by batteries consistent with the present invention also may translate into reduced charging times. Therefore, the disclosed batteries may be suitable for applications in which charging energy is available for only a limited amount of time. For instance, in vehicles, a great deal of energy is lost during ordinary braking. This braking energy may be recaptured and used to charge a battery of, for example, a hybrid vehicle. The braking energy, however, is available only for a short period of time (i.e., while braking is occurring). Thus, any transfer of braking energy to a battery must occur during braking. In view of their reduced charging times, the batteries of the present invention may provide an efficient means for storing such braking energy.

Additionally, the disclosed carbon foam current collectors may be pliable, and therefore, they may be less susceptible to damage from vibration or shock as compared to current collectors made from graphite plates or other brittle materials. Batteries including carbon foam current collectors may perform well in vehicular applications, or other applications, where vibration and shock are common.

Further, by including carbon foam in at least some of the current collectors of battery 10, the reduced density of the carbon can result in battery 10 weighing substantially less than batteries including only lead current collectors or graphite plate current collectors. Other aspects and features of the present invention can be obtained from a study of the drawings, the disclosure, and the appended claims.

What is claimed is:
1. A lead acid battery comprising:
a housing;
at least one cell disposed within the housing and including at least one positive plate and at least one negative plate; and
an electrolyte disposed in a volume between the positive and negative plates;

wherein the at least one negative plate includes a current collector, comprising of a layer of carbon foam physically attached to a structured substrate via a system of mechanical fasteners, and a chemically active material disposed on the current collector.

2. The lead acid battery of claim 1, wherein the substrate comprises an electrically conductive material.

3. The lead acid battery of claim 2, wherein the electrically conductive material includes a lead grid.

4. The lead acid battery of claim 1, wherein the substrate comprises glass or a polymer.

5. The lead acid battery of claim 4, where the substrate includes polycarbonate.

6. The lead acid battery of claim 1, wherein the at least one positive plate includes a lead grid current collector.

7. The lead acid battery of claim 6, wherein the lead grid current collector includes a radial or hexagonal grid pattern.

8. The lead acid battery of claim 1, wherein the at least one positive plate includes a carbon foam current collector.

9. The lead acid battery of claim 1, wherein the at least one positive plate includes a current collector consisting essentially of a layer of carbon foam disposed on a substrate.

10. The lead acid battery of claim 1, wherein the electrolyte includes aqueous sulfuric acid.

11. The lead acid battery of claim 1, wherein the electrolyte includes a silica gel.

12. The lead acid battery of claim 1, wherein the carbon foam has a total porosity value of at least 60% and an open porosity value of at least 70%.

13. The lead acid battery of claim 1, wherein the carbon foam has a resistivity value of less than about 1 ohm-cm.

14. The lead acid battery of claim 1, wherein said physical attachment is by a sewn thread.

15. A lead acid battery comprising:
a housing;
at least one cell disposed within the housing and including at least one positive plate and at least one negative plate; and
an electrolyte disposed in a volume between the positive and negative plates;
wherein the at least one negative plate includes a current collector, comprising of a layer of carbon foam physically attached to a structured substrate by a mechanical fastener, and a chemically active material disposed on the current collector.

16. The lead acid battery of claim 15 wherein said mechanical fastener is selected from the group consisting of a staple, a wire, a plastic loop fastener, a rivet, a swaged fastener and a screw.

17. The lead acid battery of claim 15, wherein said structured substrate is an open structure.

18. The lead acid battery of claim 15, wherein said structured substrate is a grid.

19. The lead acid battery of claim 18, wherein said grid has a cross member and a strut.

20. The lead acid battery of claim 15, further comprising a tab, said tab being disposed to establish an electrical connection to said current collector.

21. The lead acid battery of claim 15, further comprising a tab, said tab being in electrical contact with said current collector via an infusion of metal into said current collector.

* * * * *